Oct. 7, 1969   O. FELLER ETAL   3,470,710
HUB SPIDER FOR A FLEXIBLE SHAFT COUPLING
Filed Sept. 19, 1967
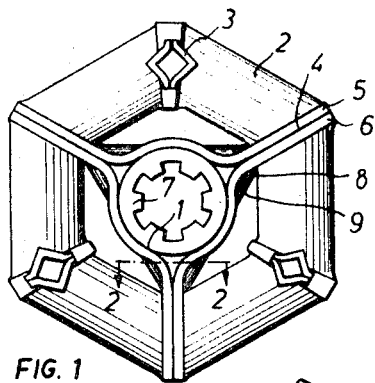
FIG. 1
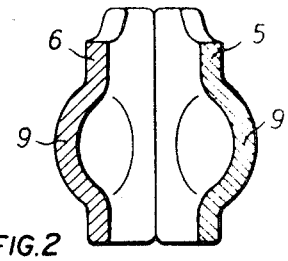
FIG. 2
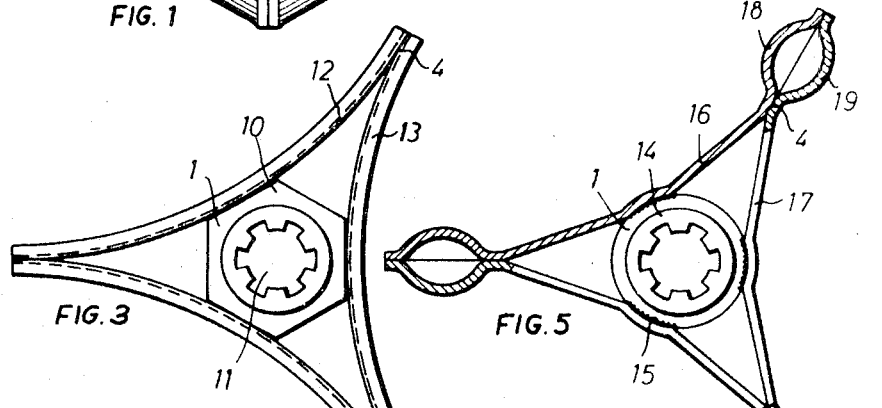
FIG. 3   FIG. 5
FIG. 4
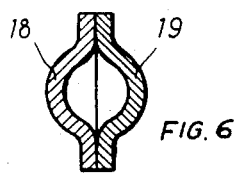
FIG. 6
FIG. 8
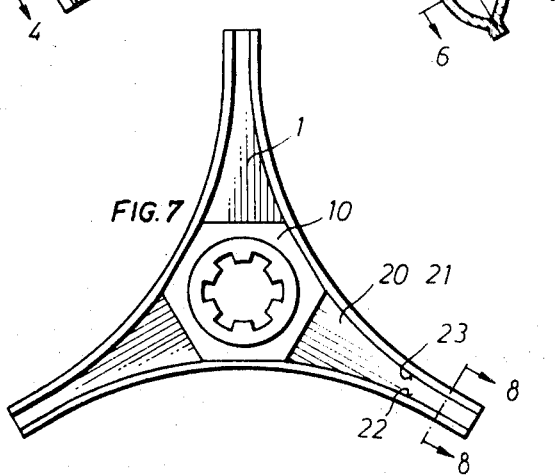
FIG. 7
Inventors
Otto FELLER & Paul VOSSIECK
By Spencer & Kaye
Attorney

United States Patent Office 3,470,710
Patented Oct. 7, 1969

3,470,710
HUB SPIDER FOR A FLEXIBLE SHAFT COUPLING
Otto Feller and Paul Vossieck, Burscheid, Germany, assignors to Goetzewerke, Friedrich Goetze A.G., Burscheid, Germany
Filed Sept. 19, 1967, Ser. No. 668,888
Claims priority, application Germany, Oct. 10, 1966, G 48,134
Int. Cl. F16d 3/78
U.S. Cl. 64—11                                                            16 Claims

ABSTRACT OF THE DISCLOSURE

A hub spider having a centrally fixed hub bushing for a flexible shaft coupling. The hub spider, which has a plurality of arms extending radially from the axis of said bushing, is constructed of sheet metal. It is formed either of a plurality of sheet metal strips running from the tip of one arm to the next or of one or more star-shaped plates having an opening at the center to receive the bushing.

BACKGROUND OF THE INVENTION

The present invention relates to a hub spider for flexible shaft couplings for motor vehicles and the like and, in particular, to a hub bushing or wheel box provided with several, preferably three, star-shaped, radially arranged arms.

Flexible shaft couplings consisting of several columnar rubber springs arranged in the form of a polygon are known in the art. Metal members (adapter sleeves) are vulcanized between the ends of the rubber springs for alternate connection, by means of screws or rivets, to claws at the driving and driven shaft ends, respectively.

Flexible shaft couplings of this type are frequently built into clutch friction discs of motor vehicles to serve as torsional vibration balancers. These couplings have a hub arranged concentrically inside their polygonal elastic element which forms the driven member. Every second adapter sleeve embedded in the rubber polygonal element is supplanted with an arm projecting star-fashion out of the hub. The rubber polygonal element is connected to its casing, formed of two half shells, by the remaining adapter sleeves embedded in the rubber.

To withstand the especially high bending stresses at the foot of the hub arms, the hub spiders used in the past have been produced as castings of a special metal. The hub spiders manufactured in this way are relatively expensive, however, and, as a result of shrinkage in the cast structure, do not consistently meet the high demands of strength.

It is also known, on the other hand, to provide the polygonal elastic elements described above with the centering collars or bushings supported concentrically with the adapter sleeves which are vulcanized between the columnar rubber springs. These centering collars, made essentially of elastic material, are connected to every second adapter sleeve by means of arms running into the radial direction. It has already been suggested that both the arm and the centering collar be reinforced by extending radially inward the two sheet metal members which, welded together, form the adapter sleeves, bending their inner free ends so that they form a part of the centering collar. Torque may therefore be transferred from one shaft through the centering collar, a first set of alternate adapter sleeves, the rubber springs, the second set of adapter sleeves and by means of screws or rivets inserted in the second set of adapter sleeves to the claws or flange of the second shaft.

SUMMARY OF THE INVENTION

An object of the present invention is to design a hub spider for flexible shaft couplings to transmit torque between a polygonal rubber coupling element and the hub which avoids the disadvantages of the hub spider casting known in the prior art. More particularly, the object of the present invention are to reduce the weight, increase the strength and to simplify the manufacture of a hub spider.

These and other objects are achieved, according to the present invention, by forming the hub arms from metal sheet and connecting them mechanically to the hub bushing or wheel box. It is immaterial as far as the invention is concerned whether the hub arms and hub bushing be made of steel or any other material which affords the necessary strength.

To simplify the manufacture of hub spiders made of metal sheet, the arms should preferably be made of several interconnected sheet metal members. It is conceivable to use sheet metal strips which run from one arm to the next, the ends of the sheet strips each forming a half of one arm. It would also be advantageous to have the central portion of the sheet strips surround a part of the hub bushing circumference.

To increase the strength or rigidity at the points of greatest stress the sheet metal members can be profiled and/or reinforced where needed. It is also conceivable to profile the sheet strips along their entire lengths to achieve, in addiiton to increased rigidity, a better adhesion at the ends of the arms with the rubber springs there vulcanized. As used herein, the term "profiled" is to be distinguished from the term "reinforced" in that the stress resistance of profiled sheet metal members is increased by changing the cross-sectional shape of the members, while the stress resistance of reinforced members is increased by attaching additional supporting members.

It is generally known that the edge stress of the columnar-shaped rubber members that function as springs can be considerably reduced by spherically shaping the vlucanization surfaces of the hub arms. To obtain this advantage, it is further suggested that the two sheet metal strips which form an arm according to the invention be cup-shaped so, pressed together, they surround a spherical cavity.

Interconnections of the sheet metal members as well as the connections between the sheet metal and the hub bushing are preferably effected by spot welding.

A piece of cylindrical pipe can most simply be employed as the hub bushing. To relieve the spot welds of the entire torsional stress it is further advantageous to provide the area of sheet metal arm contact on the outer circumference of the hub bushing with longitudinal grooves or elevations or with a bevelled surface. The hub bushings can also be manufactured, for example, by continuous casing process with bevelled edges on the outside and a spline on the inner circumference.

One further possibility for simplifying the hub spider is to use a star-shaped piece of sheet metal having a hole in the center to receive the hub bushing. Such plates need only be stamped out, drawn over the hub bushing and mechanically secured therewith. To increase the rigidity of the star-shaped arms the radial edges can be bent over in the axial direction. If this is done, the surface that comes in contact with the rubber springs will also be increased. The sheet metal plates of this type are preferably used in pairs placed back to back and drawn together over the hub bushing.

BRIEF DESCRIPTION OF THE DRAWINGS

FIGURE 1 is a diagram showing a hub spider, according to one embodiment of the invention, vulcanized into the rubber polygonal element of a flexible shaft coupling.

FIGURE 2 is a cross-sectional diagram of the foot of one hub arm of the hub spider embodiment shown in FIGURE 1.

FIGURE 3 is a diagram showing a hub spider with a six-cornered hub bushing according to another embodiment of the invention.

FIGURE 4 is a cross-sectional view of the arm of the hub spider shown in FIGURE 3.

FIGURE 5 is a diagram showing a hub spider having a circular-shaped hub bushing according to another embodiment of the invention.

FIGURE 6 is a cross-sectional view of the end of the arm of the hub spider shown in FIGURE 5.

FIGURE 7 is a diagram showing a hub spider the arms of which are formed by a sheet metal plate according to another embodiment of the invention.

FIGURE 8 is a cross-sectional view of the arms of the hub spider shown in FIGURE 7.

BRIEF DESCRIPTION OF THE PREFERRED EMBODIMENTS

Referring now to the drawings, FIGURE 1 shows a shaft coupling consisting, principally, of hub spider 1 and the columnar-shaped rubber springs 2. Between the rubber springs are alternately vulcanized the adapter sleevs 3 and the arms 4 of the hub spider 1. The hub arms 4 are formed of two strips of sheet metal 5 and 6; these arms surround and are mechanically connected to the cylindrical hub bushing 7. The sheet metal strips 5 and 6 each extend from one arm 4 to the next arm. Both ends of these strips each form half of one hub arm 4. To increase the frictional hold and therewith to better transfer the torque from the arms 4 to the hub bushing 7 the middle part of the sheet strips 5 and 6 surrounds a part of the outer circumference of the hub bushing 7. To increase the rigidity of the sheet metal strips 5 and 6 at the feet 8 of the hub arms 4, the places of greatest bending stress, they are provided with ridges or pleats 9. These ridges 9 are shown in detail in FIGURE 2, which is a cross section taken along the plane denoted by the dashed line 2—2 in FIGURE 1.

FIGURE 3 shows a hub spider 1 in its completed stage of manufacture, though without the rubber springs vulcanized thereon, according to another embodiment of the present invention. Hub bushing 10 which can be made by the continuous casting process has a hexagonal outer circumference and a splined hole at the center. The metal strips 12 and 13 which have a U-shaped profile as shown in FIGURE 4 are bent at an approximately constant radius and run from one hub arm 4 to the next. As with the previous embodiment shown in FIGURE 1, the sheet strips 12 and 13 are connected to each other and to the hub bushing 10 by means of spot welds.

A further embodiment of the hub spider 1 can be seen in FIGURE 5. The outer circumference of the hub bushing 14 is provided with longitudinal grooves 15 to insure good frictional contact with the tangent sheet strips 16 and 17. The ends of the sheet strips 16 and 17 are stamped at positions 18 and 19, to provide convex or hemispherical vulcanization surfaces. FIGURE 6 shows another cross-sectional view of these sheet strip ends 18 and 19.

According to the embodiment shown in FIGURE 7, the hub spider 1 consists of a hub bushing 10 and two metal sheet plates 20 and 21 welded back to back. The outer edges 22 and 23 of the sheet plates 20 and 21 are bent over in the axial direction to improve the rigidity and increase the contact surface with the rubber springs, not shown. FIGURE 8, a cross-sectional view taken near the end of one of the hub arms, shows the metal plates 20 and 21 in profile with edges 22 and 23.

The main advantage of the present invention is that the manufacture of the hub spiders from sheet metal parts is made considerably simpler than the special casting process used in the past. The sheet strips for the hub arms are cut to length from metal strips of the proper width; they are bent; and, if necessary, profiled in a single pass of a stamping machine. The hub bushings need only be cut off fom a long bar of bushing material. The individual parts can then be placed in a single machine which joins them and welds them together in a matter of seconds. The hub spiders manufactured in this way have a considerably higher strength per unit weight than do the cast spiders of the prior art.

The welded hub spiders according to the present invention better hold their shape than do the castings of the prior art. This advantage achieves special importance during the vulcanization process.

It will be understood that the above description of the present invention is suspectible to various modifications, changes and adaptations, and the same are intended to be comprehended within the meaning and range of equivalents of the appended claims.

We claim:

1. In a flexible coupling for coupling two rotatable shafts, said coupling having a plurality of column-like springs made from an elastic material and connected together to form a polygonal ring; a hub bushing and a plurality of hub arms extending radially from the axis of said bushing and fixed to said bushing to prevent said bushing from rotating independently of said arms; the improvement that said hub arms consist of a plurality of sheet metal strips which run from the tip of one arm to the tip of the next, the ends of each of said strips forming one half of one of said arms.

2. The improvement defined in claim 1 wherein said plurality of hub arms is three.

3. The improvement defined in claim 1 wherein the central portion of each of said strips surrounds a part of said bushing.

4. The improvement defined in claim 1 wherein said sheet metal strips are profiled at the places thereof which are subjected to greater stress.

5. The improvement defined in claim 1 wherein said sheet metal is profiled along their entire length.

6. The improvement defined in claim 1 wherein said ends of each of said strips are cup-shaped so as, together with the strip forming the other half of the arm, to surround a spherical cavity.

7. The improvement defined in claim 1 wherein said sheet metal strips are joined together by means of welds or spot welds.

8. The improvement defined in claim 1 wherein said hub bushing consists of a section of cylindrical steel pipe.

9. The improvement defined in claim 1 wherein the outer circumference of said bushing is provided with longitudinal grooves.

10. The improvement defined in claim 1 wherein the outer circumference of said bushing is provided with a plurality of bevelled edges.

11. The improvement defined in claim 1 wherein said sheet metal strips are reinforced at the places thereof which are subjected to greater stress.

12. In a flexible coupling for coupling two rotatable shafts said coupling having a plurality of column-like springs made from an elastic material and connected together to form a polygonal ring; a hub bushing; and a plurality of hub arms extending radially from said bushing and fixed to said bushing to prevent said bushing from rotating independently of said arms; the improvement that said arms comprise at least one star-shaped sheet metal plate having an opening at the center for receiving said bushing, said at least one sheet metal plate being profiled at the places thereof which are subjected to greater stress.

13. The improvement defined in claim 12 wherein the outer circumference of said bushing is provided with a plurality of bevelled edges.

14. In a flexible coupling for coupling two rotatable shafts said coupling having a plurality of column-like springs made from an elastic material and connected together to form a polygonal ring; a hub bushing; and a plurality of hub arms extending radially from said bushing and fixed to said bushing to prevent said bushing from rotating independently of said arms; the improvement that said arms comprise at least one star-shaped sheet metal plate having an opening at the center for receiving said bushing, said at least one sheet metal plate being profiled along the entire length of the arms thereof.

15. In a flexible coupling for coupling two rotatable shafts said coupling having a plurality of column-like springs made from an elastic material and connected together to form a polygonal ring; a hub bushing; and a plurality of hub arms extending radially from said bushing and fixed to said bushing to prevent said bushing from rotating independently of said arms; the improvement that said arms comprise at least one star-shaped sheet metal plate having an opening at the center for receiving said bushing, and wherein the outer circumference of said bushing is provided with longitudinal grooves.

16. In a flexible coupling for coupling two rotatable shafts said coupling having a plurality of column-like springs made from an elastic material and connected together to form a polygonal ring; a hub bushing; and a plurality of hub arms extending radially from said bushing and fixed to said bushing to prevent said bushing from rotating independently of said arms; the improvement that said arms comprise at least one star-shaped sheet metal plate having an opening at the center for receiving said bushing and having edges which are bent over, thereby to increase the rigidity of said plate.

References Cited
UNITED STATES PATENTS

| | | | |
|---|---|---|---|
| 1,840,714 | 1/1932 | Guy | 64—1 |
| 1,862,140 | 6/1932 | Guy | 64—1 |
| 2,828,616 | 4/1958 | Zeigler et al. | 64—11 |
| 3,238,742 | 3/1966 | Martorana | 64—1 |

FOREIGN PATENTS 444,935   2/1949   Italy.

OTHER REFERENCES

Ulderup: German App. No. 1,157,440, Pub. Nov. 14 1963.

HALL C. COE, Primary Examiner

U.S. Cl. X.R.

64—14